US007680933B2

(12) United States Patent
Fatula, Jr.

(10) Patent No.: US 7,680,933 B2
(45) Date of Patent: Mar. 16, 2010

(54) APPARATUS, SYSTEM, AND METHOD FOR ON-DEMAND CONTROL OF GRID SYSTEM RESOURCES

(75) Inventor: Joseph John Fatula, Jr., San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1512 days.

(21) Appl. No.: 10/736,473

(22) Filed: Dec. 15, 2003

(65) Prior Publication Data

US 2005/0131898 A1 Jun. 16, 2005

(51) Int. Cl.
*G06F 15/173* (2006.01)
*G06F 15/16* (2006.01)
*G06F 12/00* (2006.01)
*G06F 17/30* (2006.01)

(52) U.S. Cl. .................. 709/226; 709/224; 709/229; 707/202; 707/204

(58) Field of Classification Search .......... 709/226, 709/224, 229; 707/202, 204
See application file for complete search history.

(56) References Cited

U.S. PATENT DOCUMENTS

| | | | | |
|---|---|---|---|---|
| 5,729,715 | A | 3/1998 | Ina et al. ............... | 395/489 |
| 5,813,017 | A | 9/1998 | Morris .................. | 707/204 |
| 5,819,020 | A | 10/1998 | Beeler, Jr. ............. | 395/182.03 |
| 5,956,733 | A | 9/1999 | Nakano et al. ......... | 707/204 |
| 5,974,563 | A | 10/1999 | Beeler, Jr. ............. | 714/5 |
| 6,418,462 | B1 * | 7/2002 | Xu ....................... | 709/201 |
| 6,460,082 | B1 * | 10/2002 | Lumelsky et al. ...... | 709/226 |
| 6,463,457 | B1 * | 10/2002 | Armentrout et al. ... | 709/201 |
| 6,505,216 | B1 | 1/2003 | Schutzman et al. .... | 707/204 |
| 6,526,418 | B1 | 2/2003 | Midgley et al. ........ | 707/204 |
| 6,571,257 | B1 | 5/2003 | Duggan et al. ......... | 707/202 |
| 2002/0013832 | A1 | 1/2002 | Hubbard | |
| 2002/0124137 | A1 | 9/2002 | Ulrich et al. .......... | 711/113 |
| 2002/0184249 | A1 | 12/2002 | Shibata ................. | 707/204 |
| 2004/0064480 | A1 * | 4/2004 | Bartlett et al. ......... | 707/104.1 |
| 2004/0093381 | A1 * | 5/2004 | Hodges et al. ......... | 709/204 |
| 2004/0153545 | A1 * | 8/2004 | Pandya et al. ......... | 709/226 |
| 2004/0199633 | A1 * | 10/2004 | Pearson ................ | 709/226 |

(Continued)

OTHER PUBLICATIONS

Fox et al. "A summary of Grid computing environments"; Concurrency and Computation: Practice and Experience; vol. 14, Issue 13-15, pp. 1035-1044 (Nov.-Dec. 2002).*

(Continued)

*Primary Examiner*—Vivek Srivastava
*Assistant Examiner*—Lin Liu
(74) *Attorney, Agent, or Firm*—Kunzler & McKenzie

(57) ABSTRACT

An apparatus, system, and method are disclosed for on-demand control of a grid system resource on a grid computing system. An on-demand management apparatus includes a user input module, a parameter module, and a reservation module. The user input module is configured to allow a user to input a parameter control request. The parameter control request corresponds to a performance parameter of the grid computing system. The global parameter module is configured to dynamically change the performance parameter, which corresponds to a performance resource, according to the parameter control request. The global reservation module is configured to reserve the performance resource for a grid computing operation. The on-demand management apparatus is also configured to terminate a performance resource reservation when a client reclaims the performance resources from the grid computing system.

30 Claims, 10 Drawing Sheets

U.S. PATENT DOCUMENTS

2005/0027863 A1* 2/2005 Talwar et al. ............... 709/226
2005/0044226 A1* 2/2005 McDermott et al. ......... 709/226
2005/0125537 A1* 6/2005 Martins et al. ............. 709/226
2006/0294238 A1* 12/2006 Naik et al. ................. 709/226

OTHER PUBLICATIONS

IBM White paper on "Grid Computing: Distributed Advantage" found at "http://www-03.ibm.com/industries/chemicalspetroleum/doc/content/bin/IBM_Consulting_Grid_computing_Distributed_advantage.pdf"; Nov. 2001.*

C. Anglano, S. Barale, L. Gaido, A. Guarise, S. Lusso, and A. Werbrouck, "An Accouting System For The Datagrid Project", Feb. 27, 2002, XP002354137, URL: http://server11.infn.it/workload-grid/docs/DataGrid-01-TED-0115-3_0.pdf>.

Pazel D P, et al.: "Nuptune: a dynamic resource allocation and planning system for a cluster computing utility", Proceedings of hte 2nd IEEE/ACM International Symposium on Cluster Computing and the Grid (CCGRID'02), Berlin Germany, May 21-24, 2002, ISBN: 0-7695-1582-7.

Schwiegelshohn, Yahyapour: "Attributes for Communication Between Scheduling Instances", Dec. 4, 2003, pp. 1-10, URL: http://web.archive.org/web/20031204234.

* cited by examiner

APPARATUS, SYSTEM, AND METHOD FOR ON-DEMAND CONTROL OF GRID SYSTEM RESOURCES

BACKGROUND OF THE INVENTION

1. Field of the Invention

This invention relates to grid computing and more particularly relates to on-demand control of performance resources on a grid computing system.

2. Description of the Related Art

Grid computing is a relatively new technology in the computing industry. Many current grid computing systems are designed to allow multiple interconnected computers, or nodes, to work together on large grid applications, such as computational problems, that would be impossible to do on a single machine. In order to feasibly manage such overwhelming amounts of computational processing, the computational problem may be divided into several smaller, more manageable jobs. This type of shared processing of grid applications is possible in part because of the enforced or incidental idle processor time of many personal and business computers.

Additionally, grid computing systems may allow for shared storage across a plurality of nodes within the system. In this way, data may be stored remotely on the system, in the form of a backup, for example, and allow large amounts of data to be virtually stored by a single node.

One of the major issues in designing and implementing grid computing systems is resource management. Managing the performance resources available to the grid computing system is fundamental to the efficacy of the system. For example, with various disparate storage, memory, and processing resources available from the many nodes in a grid computing system, somehow these performance resources must be utilized within the grid system in an organized and productive manner.

Some grid computing systems are built exclusively for grid computing operations. In this scenario, all of the performance resources of all of the connected nodes are dedicated to the grid computing system. Although the grid system operation must be assigned out to specific node resources, there is very little need, if any, for such a grid computing system to dynamically manage the allocated performance resources because the amount of resources available to the grid is relatively static. Except for the occasional downtime of a failed device, the performance resources within this type of grid computing system remain dedicated to the grid system.

Other grid computing systems rely on nodes that may be available to the grid computing system infrequently or less than on a dedicated basis. For example, some grid computing systems contain software on each node that performs calculations on data received through the grid computing system. Input data may be transferred to the node during a minimal period of connectivity to the grid computing system. The calculations are performed during system idle time of the node, such as during the operation of a screensaver application. The computational results are then transferred back to the grid server during a subsequent period of connectivity to the grid computing system. Alternately, the calculation may be performed as a background application using processing cycles not utilized for local applications on the node.

However, for grid applications that require substantial connectivity to the grid system for large amounts of data transfer, such as data backup applications, the availability (i.e. accessibility, capacity, etc.) of performance resources on a particular node may become more determinative of the efficacy of the grid computing system. It follows that management of the available performance resources is also more important to the operation of the grid computing system. Unfortunately, conventional grid computing systems are generally inadequate to manage the dynamic availability of performance resources made available to the grid computing system on a non-dedicated basis.

Consequently, a need exists for an apparatus, system, and method that facilitate favorable on-demand control of performance resources on a grid computing system. Beneficially, such an apparatus, system, and method would overcome many of the current performance limitations on non-dedicated grid computing systems.

BRIEF SUMMARY OF THE INVENTION

The present invention has been developed in response to the present state of the art, and in particular, in response to the problems and needs in the art that have not yet been fully solved by currently available grid computing systems. Accordingly, the present invention has been developed to provide an apparatus, system, and method for on-demand control of a system resource on a grid computing system that overcome many or all of the above-discussed shortcomings in the art.

The apparatus for on-demand control of a system resource on a grid computing system is provided with a logic unit containing a plurality of modules configured to functionally execute the necessary steps of on-demand control of a system resource on a grid computing system. These modules in the described embodiments include a global user input module, a global parameter module, a global reservation module, a global profile management module, and a global profile synchronization module. In one embodiment, the system resource may be a network performance resource, including network accessibility or network bandwidth. In another embodiment, the system resource may be a client performance resource, including client accessibility, client bandwidth allocation, client processor allocation, client storage allocation, or client memory allocation.

A system of the present invention is also presented for on-demand control of a system resource on a grid computing system. The system may be embodied in a local area network, a wide area network, a combination of local and wide area networks, one or more wireless networks, an internet-based grid computing network, or any other number of grid computing environments. In particular, the system, in one embodiment, includes a global on-demand management apparatus, a local on-demand management apparatus, a user input module, an allocation module, and a reservation module. The system may further include a subscription manager configured to manage a fee subscription for each of the clients connected to the grid computing system.

A client is also presented for on-demand control of a system resource on a grid computing system. In one embodiment, the client is provided with a logic unit containing a plurality of modules configured to functionally execute the necessary steps of on-demand control of a system resource on a grid computing system. These modules in the described embodiments include a client user input module, a client parameter module, a client allocation module, a client reclamation module, a client profile management module, and a client profile synchronization module.

A method of the present invention is also presented for on-demand control of a system resource on a grid computing system. The method in the disclosed embodiments substantially includes the steps necessary to carry out the functions presented above with respect to the operation of the described apparatus and system. In one embodiment, the method includes allowing a user to input a parameter control request, dynamically changing the performance parameter according to the parameter control request, and reserving the performance resource for a grid computing operation. The parameter control request may correspond to a performance parameter of the grid computing system. Furthermore, the performance parameter may correspond to a performance resource.

The method also may include storing a network profile, storing a global client profile, and storing a user-defined client profile. In a further embodiment, the method includes terminating the reservation of the performance resource in response to a client reclamation operation. Still further, the method may include synchronizing one or more of the profiles stored on the global on-demand manager with one or more profiles stored on a client. Still further, the method may include storing one or more profile histories.

One embodiment of the present invention beneficially allows dynamically allocated performance resources to be properly managed within a grid computing environment. Additionally, another embodiment of the present invention beneficially allows grid system users to allocate and reclaim performance resources on-demand, as well-as enabling dynamic allocation and reclamation of performance resources for specific client nodes within specified operating conditions.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
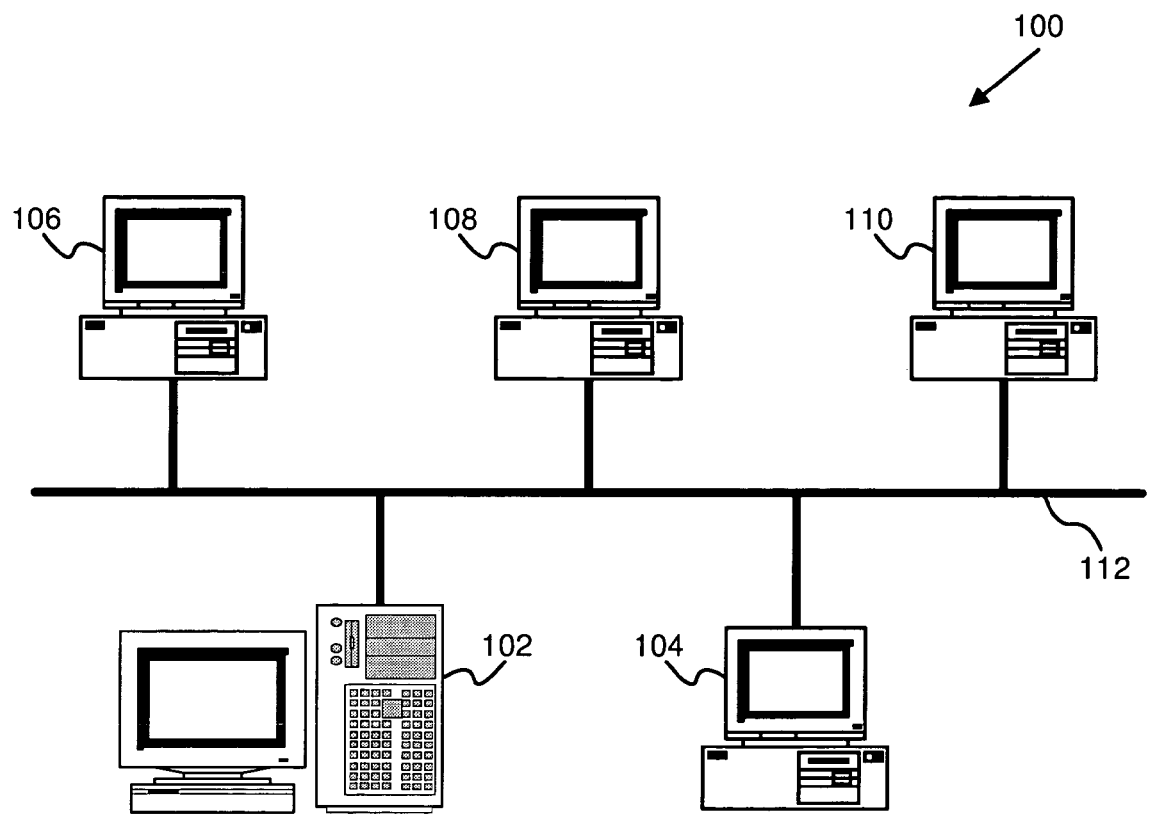
FIG. 1 is a schematic block diagram illustrating one embodiment of a grid system in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, over disparate memory devices.

Furthermore, modules may also be implemented as a combination of software and one or more hardware devices. For instance, a module may be embodied in the combination of a software executable code stored on a memory device. In a further example, a module may be the combination of a processor that operates on a set of operational data. Still further, a module may be implemented in the combination of an electronic signal communicated via transmission circuitry.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, databases, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

FIG. 1 depicts a grid system 100 that comprises a grid server 102 connected to multiple clients 104-110, or nodes, via a communications channel 112. The illustrated grid system 100 is similar to a local area network (LAN), and the communications channel 112 may be, in one embodiment, an Ethernet communications channel, a wireless communications channel, or another equivalent communications channel. Likewise, the communications channel 112 may comprise a combination of various types of communications channels. Although the depicted grid system 100 includes one grid server 102 and four clients 104-110, the grid system 100 may comprise a combination of various network configurations having fewer or more clients 104-110, more than one server 102, or alternate server configurations. In a further embodiment, the grid system 100 also may include a subscription manager (not shown) as described with reference to FIG. 2. In one embodiment, the grid server 102 may concurrently act as the subscription manager of the grid system 100.

The grid system 100 is configured, in one embodiment, to execute a grid application. A grid application is a collection of work items that together achieve a specified objective. For example, a grid application may determine very complex mathematical calculations, including weather forecasting, stock market development, and so forth. A grid application also may process large-scale multimedia operations. In another embodiment, a grid application may perform data backup operations on large and diverse amounts of data. In each of these scenarios, execution of a grid application may require the cooperation of several nodes 104-110 within the grid system 100.

A grid application may be divided into jobs, or single units of work. The several jobs of a grid application may be executed concurrently, serially, or co-dependently on one or more of the various nodes 104-110. Each of the nodes 104-110 may allocate certain performance resources to the grid system 100 for execution of grid applications. These performance resources made available by the clients 104-110 may include processor capability, processor capacity, storage capacity, memory capacity, and other similar resources. In one embodiment, a client 104-110 may dedicate a specific amount of total processor capability, storage capacity, or memory capacity to the grid system 100 for execution of grid applications.

Each client 104-110 may act as either a source client or a resource client, depending on the role of the client 104-110 in a particular grid application. For example, where the client 104-110 initiates a grid application, the client 104-110 acts as a source client. Alternately, where the client 104-110 makes local performance resources available for execution of a remotely initiated grid application, the client 104-110 acts as a resource client. For example, in the case of a grid backup operation, a source client may have backup data files on one or more resource clients where the resource clients allocate some available storage to the grid system 100 for such backup grid applications. In a further embodiment, the grid server 102 also may act as a client on the grid system 100 in that it may initiate grid applications and make local performance resources available to the grid system 100, in addition to acting as a server 102 for the network 100.

Figure 2:
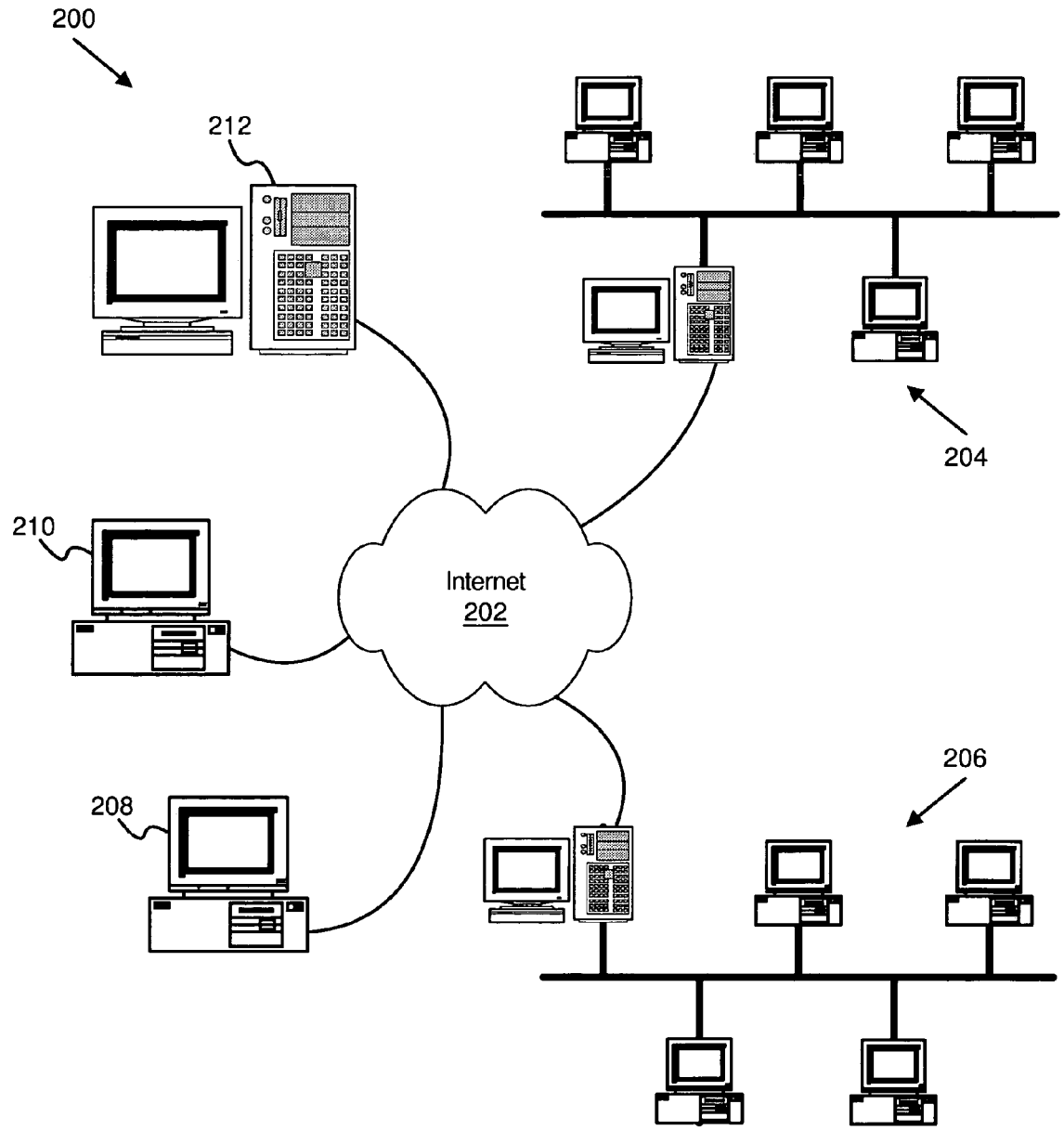
FIG. 2 is a schematic block diagram illustrating another embodiment of a grid system in accordance with the present invention.

FIG. 2 depicts another embodiment of a grid system 200 that is similar in some aspects to the grid system 100 of FIG. 1. The illustrated grid system 200 operates over the internet 202, which provides a communications channel among the various other components of the grid system 200. The illustrated grid system 200 also includes network systems 204, 206, which are similar to the grid system 100 shown in FIG. 1, that form sub-systems within the grid system 200 of FIG. 2. Additionally, the grid system 200 may include other clients 208, 210 that are directly connected to the internet in that they are not a part of a local network.

The grid system 200 also may include a subscription manager 212 configured to manage a client subscription to the grid computing system 200. The subscription manager 212, in one embodiment, may manage the use of the grid system 100 by a subscribed client in terms of client fees or permission for a client to use a grid system resource or expect a certain level of service from the grid computing system 100. The subscription manager 212 may alternatively be connected to other network systems 204, 206 within the grid system 200. In a further embodiment, the grid system 200 may have multiple subscription managers 212 that each manages independently defined subscription groups.

As mentioned above, other similar grid system configurations may be employed in place of or in addition to the grid systems 100, 200 depicted in FIGS. 1 and 2. In the following description, reference to either of the grid systems 100, 200 is meant to interchangeably refer to either or both of the grid systems 100, 200, unless the exclusion of one of the grid systems 100, 200 is explicitly noted.

Figure 3:
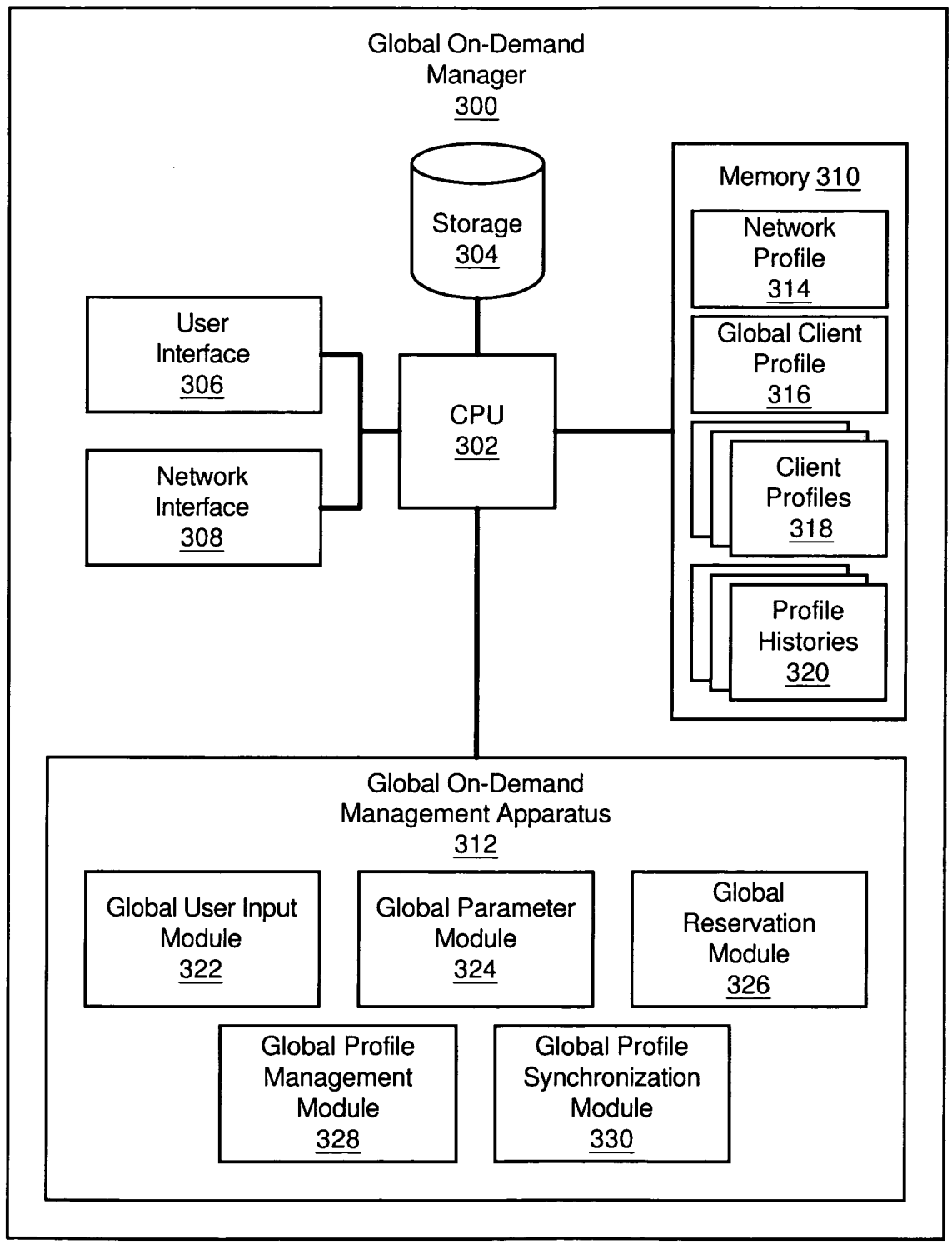
FIG. 3 is a schematic block diagram illustrating one embodiment of a global on-demand manager in accordance with the present invention.

FIG. 3 depicts one embodiment of a global on-demand manager 300. The illustrated global on-demand manager 300 is configured, in one embodiment, to facilitate on-demand control of performance resources on the grid system 100. In one embodiment, the global on-demand manager 300 includes a central processing unit (CPU) 302, a local storage device 304, a user interface 306, a network interface 308, a memory 310, and a global on-demand management apparatus 312. The CPU 302 is configured generally to execute operations within the global on-demand manager 300. The user interface 306, in one embodiment, is configured to allow a user to interact with the global on-demand manager 300, including allowing input data and commands from a user and communicating output data to the user. The network interface 308 is configured, in one embodiment, to facilitate network communications of the global on-demand manager 300 over the communications channel 112 of the grid network 100.

The local memory 310 is configured, in one embodiment, to store several data and metadata files that may be used in conjunction with the on-demand control of grid performance resources. In an alternative embodiment, some or all of these data and metadata files may be replicated in the local storage device 304. In a further embodiment, one or all of these data and metadata files may be stored exclusively in the local storage device 304 rather than in the memory 310. Similarly, these data and metadata files may be stored on a combination of local memory 310 and storage 304. In another embodiment, one or all of these data and metadata files may be stored in distributed storage on the grid system 100. Although the present description refers to "files," the present invention is understood to operate in substantially the same manner using other electronic memory and storage structures. Reference herein to a data file or metadata file is understood to equivalently refer to other such electronic memory and storage structures.

In particular, the memory 310 may store a network profile 314, a global client profile 316, one or more user-defined client profiles 318, and one or more profile histories 320. The network profile 314, in one embodiment, is configured to store one or more network parameters indicating the network resources dedicated or allocated to the grid system 100. Use of the phrases "parameter," "a parameter," "the parameter," and similar phrases refer to a local or global variable whose value may include single values, invariant values, multi-dimensional arrays, data sets, time-dependent values, values that vary with a function of another value, and so forth. These phrases are not intended to be limited to mean storing a single, invariant value for a given parameter.

For example, the network profile 314 may store a network accessibility parameter that indicates what percentage of time the network is available to the grid system 100. In one embodiment, the network accessibility parameter may refer to the amount of time the entire network is dedicated to the grid system 100. Alternately, the network accessibility parameter may refer to the amount of time that the network is at least partially available, even if not all of the network resources are available or even substantially dedicated to the grid system 100.

The network profile 314 also may store a network bandwidth allocation parameter that indicates the amount of network bandwidth, or portion thereof, that may be allocated to grid system operations. In one embodiment, the network bandwidth may be dedicated to the grid system 100, disallowing non-grid operation to consume the allocated bandwidth. In another embodiment, the allocated network bandwidth may be available to the grid system 100, but used by the local network for non-grid operation during time when the grid system 100 is not using the bandwidth.

The memory 310 also may store a global client profile 316 that is configured, in one embodiment, to store one or more globally controlled client parameters. For example, the global client profile 316 may store a global client accessibility parameter, a global client bandwidth allocation parameter, a global client processor allocation parameter, a global client storage allocation parameter, a global client memory allocation parameter, a global client backup recoverability parameter, a global client backup proximity parameter, and so forth. In one embodiment, the global client profile 316 determines the default settings for a client 104-110 on the grid system 100 unless a user modifies and overrides the global client profile 316 with a user-defined client profile 318. In an alternative embodiment, the global client profile 316 may determine a default maximum or minimum setting for a client 104-110 on the grid system 100. For instance, the global client profile 316 may determine a maximum performance level for a grid application from a particular source client based on the client subscription agreement.

In one embodiment, the global client accessibility parameter, global client bandwidth allocation parameter, global client processor allocation parameter, global client storage allocation parameter, and global client memory allocation parameter each correspond to a client performance resource that is allocated or otherwise made available to the grid system 100. In this capacity, the client 104-110 is acting as a resource client.

The global client accessibility parameter may indicate the amount of time that the client 104-110 is available (i.e. electronically connected to) to the grid computing system 100. The global client bandwidth allocation parameter, in one embodiment, may indicate the amount of client bandwidth that is dedicated to grid system operations. The global client processor allocation parameter may indicate, in one embodiment, the amount of time or processing capability that is dedicated to grid system operations. Likewise, the global client storage allocation parameter and the global client memory allocation parameter may refer to the amount of client storage and memory, respectively, that are allocated to grid system operations.

In one embodiment, the global client backup recoverability parameter and global client backup proximity parameter correspond to a client preference when the client 104-110 is acting as a source client. The global client backup recoverability parameter, in one embodiment, may indicate a desired level of recoverability for any data from the source client remotely stored on a resource client. The more recoverability requested by a source client, the more available the resource client may need to be in order to service a data access request by the source client.

The global client backup proximity parameter, in one embodiment, may indicate a data backup parameter that controls the proximity to a source client of backup data stored on a remote resource client. Similarly, the global client profile 316 may store a global client packet proximity parameter to indicate the distance resource clients on which between backup data packets are stored. The client backup and packet proximity parameters may indicate, in one embodiment, a physical distance, such as miles or kilometers. The distance between nodes 104-110 may be calculated or estimated, for instance, using global positioning system (GPS) coordinates. In an alternative embodiment, the client backup and packet proximity parameters may indicate a logical distance. For example, the client backup and packet proximity parameters may reference the internet protocol (IP) address of the source client and specify that the backup packets be stored on target clients within a different network or subnet. In a further embodiment, the client backup and packet proximity parameters may inclusively or exclusively specify certain nodes 104-110 on which to store or not to store the backup data packets.

In one embodiment, the memory 310 may store a plurality of client profiles 318. Each of the client profiles 318 corresponds to a particular client 104-110 on the grid computing system 100 and may store user-defined client parameters. For example, a client profile 318 may store a user-defined client accessibility parameter, a user-defined client bandwidth allocation parameter, a user-defined client processor allocation parameter, a user-defined client storage allocation parameter, a user-defined client memory allocation parameter, a backup recoverability parameter, a user-defined client backup proximity parameter, and so forth. Each of these user-defined parameters is similar to the corresponding global parameters described above. As described above, the memory 310 also may store one or more profile histories 320. Each of the profile histories 320 may store a history of a client profile 318 for a specific client 104-110 on the grid system 100.

The global on-demand management apparatus 312 is configured, in one embodiment, to facilitate on-demand control of performance resources on the grid system 100. The illustrated global on-demand management apparatus 312 includes a global user input module 322, a global parameter module 324, a global allocation module 326, a global profile management module 328, and a global profile synchronization module 330.

In one embodiment, the global user input module 322 may be configured to allow a user to input a parameter control request to change a performance parameter of the grid system 100. The performance parameter may be a client performance parameter, a network performance parameter, or a grid performance parameter. Additionally, the performance parameter may be a global performance parameter or a user-defined performance parameter.

The global parameter module 324, in one embodiment, is configured to modify a performance parameter according to the parameter control request received by the global user input module 322. For example, if a user requests that more network bandwidth be allocated to the grid system 100, the global parameter module 324, may increase the network bandwidth allocation parameter to the requested amount.

The global reservation module 326 is configured, in one embodiment, to reserve an allocated performance resource for a particular grid system operation. For example, once a resource client has allocated a specific client performance resource to the grid system 100, the global reservation module 326 may reserve all or part of the allocated resource for a particular grid operation. In a further embodiment, the global reservation module 326 is configured to terminate a resource reservation or otherwise unassign a performance resource that was previously reserved for a specific grid system operation.

The global profile management module 328, in one embodiment, is configured to manage the profiles stored on the memory 310 or the storage 304, including the network profile 314, the global client profile 316, the user-defined client profiles 318, and the profile histories 320. In a related manner, the global profile synchronization module 330 is configured, in one embodiment, to synchronize the client profiles 318 and profile histories 320 on the global on-demand manager 300 with any profiles or histories that exist on the clients 104-110 or other nodes of the grid system 100.

Figure 4:
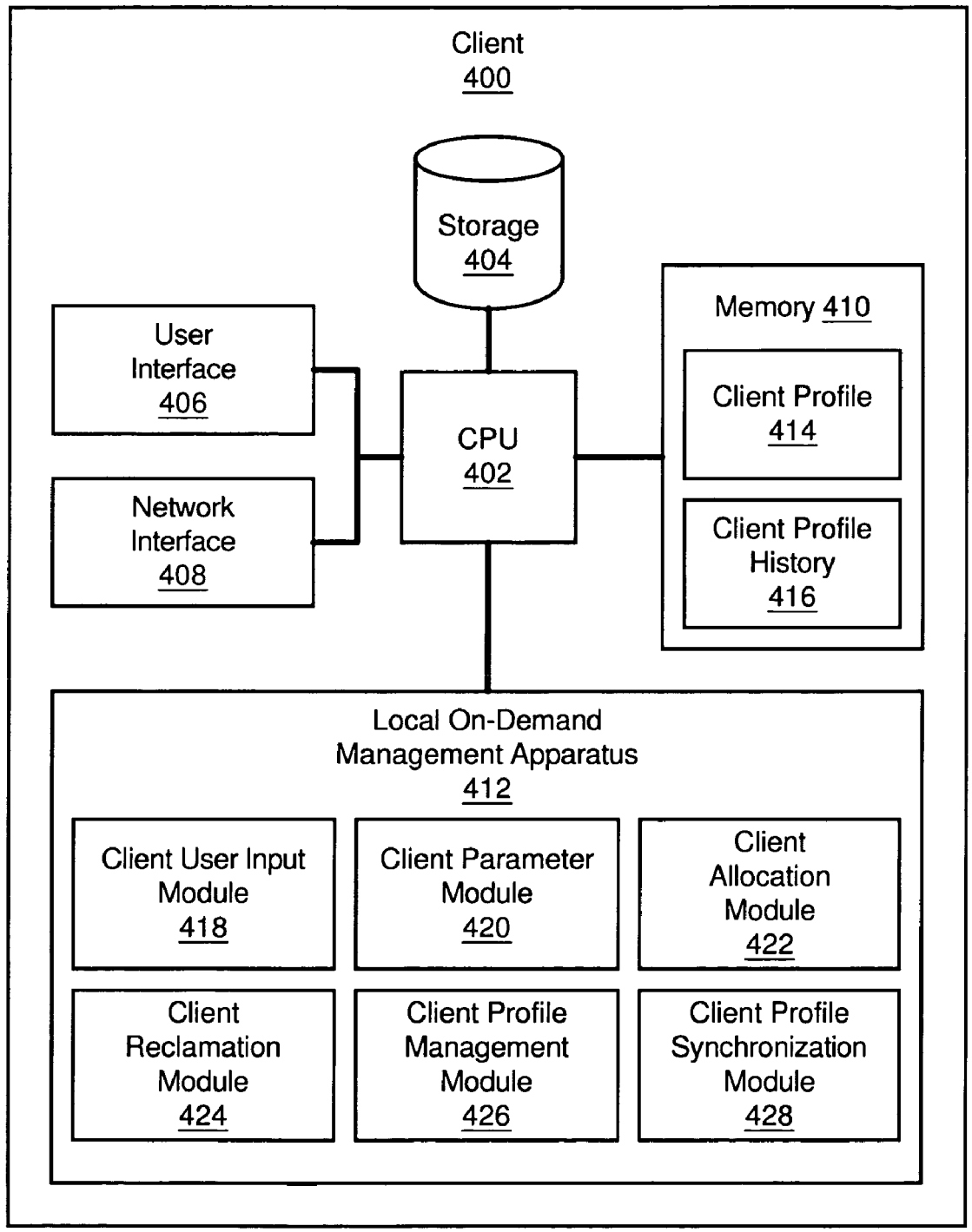
FIG. 4 is a schematic block diagram illustrating one embodiment of a client in accordance with the present invention.

FIG. 4 depicts one embodiment of a client 400 that may operate as either a source client or a resource client within the grid system 100. Like the global on-demand manager 300 of FIG. 3, the client 400 includes a CPU 402, a local storage device 404, a user interface 406, a network interface 408, and a memory 410. The illustrated client 400 also includes a local on-demand management apparatus 412. The CPU 402, user interface 406, and network interface 408 of the client 400 are substantially similar to the CPU 302, user interface 306, and network interface 308 of the global on-demand manager 300.

The memory 410, in one embodiment, may be configured to store a client profile 414 and a client profile history 416. In one embodiment, the client profile 414 on the client 400 is substantially similar to either the global client profile 316 or one of the user-defined client profiles 318 on the global on-demand manager 300. For example, the a client profile 414 may store a user-defined client accessibility parameter, a user-defined client bandwidth allocation parameter, a user-defined client processor allocation parameter, a user-defined client storage allocation parameter, a user-defined client memory allocation parameter, a backup recoverability parameter, a user-defined client backup proximity parameter, and so forth.

Similarly, the client profile history 416 on the client 400 is substantially similar to one of the profile histories 320 on the global on-demand manager 300, as described above. Specifically, the client profile history 416 is configured to store a history of the client profile 414 over a period of time. The client profile history 416, in one embodiment, may be used if a user wants to revert to a previous, specified client profile. In a further embodiment, the client profile history 416 may facilitate billing a subscriber to the grid system 100, where the billing is dependent on the grid system usage over time, resource allocation over time, allocation consistency over time, and so on.

The illustrated local on-demand management apparatus 412, in one embodiment, may be configured to facilitate on-demand control of performance resources on the grid system 100. The depicted local on-demand management apparatus 412 includes a client user input module 418, a client parameter module 420, a client allocation module 422, a client reclamation module 424, a client profile management module 426, and a client profile synchronization module 428.

In one embodiment, the client user input module 418, client parameter module 420, client profile management module 426, and a client profile synchronization module 428 are similar to the corresponding modules 322, 324, 328, 330 on the global on-demand management apparatus 312. For example, in one embodiment, the client user input module 418 may be configured to allow a user to input a parameter control request to change a performance parameter of the client 400.

The client parameter module 420, in one embodiment, is configured to modify a performance parameter in the client profile 414 according to the parameter control request received by the client user input module 418. For example, if a user requests that additional local storage 404 be allocated to the grid system 100, the client parameter module 420, may increase the client storage allocation parameter to the requested amount.

The client profile management module 426, in one embodiment, is configured to manage the client profile 414 stored in the memory 410 or the storage 404, including the client profile history 416. In a related manner, the client profile synchronization module 428 is configured, in one embodiment, to synchronize the client profile 414 and the client profile history 416 on the client 400 with the client profiles 318 and profile histories 320 that exist on the global on-demand manger 300.

The client allocation module 422 is configured, in one embodiment, to allocate a client performance resource to the grid system 100 according to the client profile 414. As mentioned above, the client performance resource may be any performance resource that the client 400 may make available for grid system operations, including client accessibility, client bandwidth, client processor, client storage, client memory, and so forth. Correspondingly, the client reclamation module 424, in one embodiment, is configured to reclaim a client performance resource that is allocated to the grid system 100. Reclaiming a client performance resource makes the resource unavailable to the grid system 100. Hence, the global on-demand management apparatus 312 cannot reserve, via the global reservation module 326, a reclaimed client performance resource.

In one embodiment, the local on-demand management apparatus 412 and the global on-demand management apparatus 312 may reside on a single node of the grid system 100. The node may act as a client 400 when allocating and reserving client performance resources to the grid system 100. Additionally, the node may act as a global on-demand manager 300 when reserving client performance resources for particular grid system operations.

Figure 5:
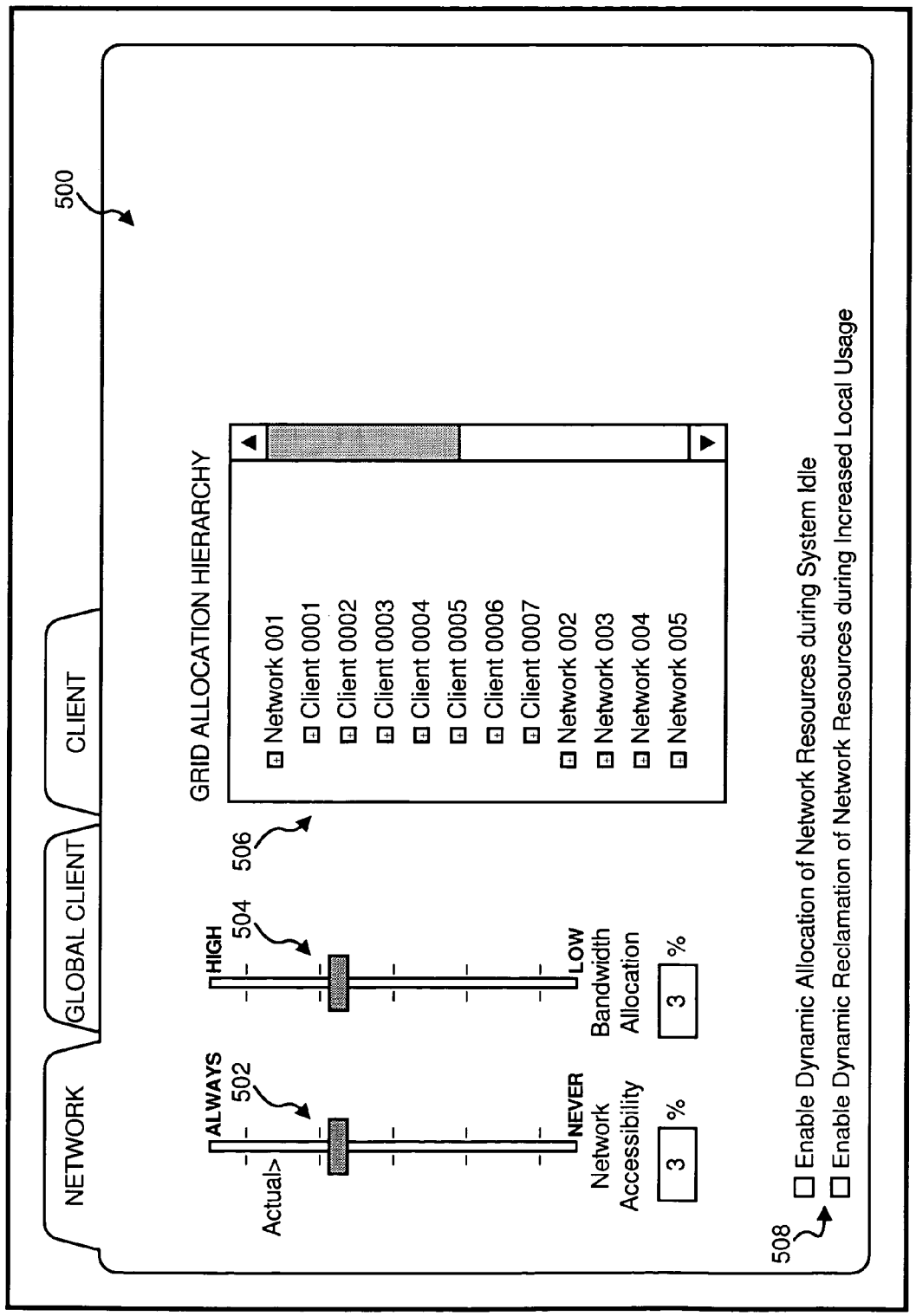
FIG. 5 is a schematic diagram illustrating one embodiment of a network user interface in accordance with the present invention.

FIG. 5 depicts one embodiment of a network user interface 500 that may be employed on a global on-demand manager 300. The illustrated network user interface 500 facilitates on-demand control of grid system resources, especially of network resources particular to a single network 204, 206 connected to the grid system 100. Although the network user interface 500 is shown in a particular format as it might appear on a computer screen, one skilled in the art will recognize that many other similar means may be used to implement an equivalent network user interface 500.

The network user interface 500 shown in FIG. 5 includes a network accessibility user control 502, a network bandwidth allocation user control 504, a network grid allocation hierarchy user control 506, and a network dynamic enablement user control 508. Each of the user controls 502-508 may include one or more user selectors for controlling a particular performance resource. For example, a user control may include a graphical slide control, a numeric input control, a text input control, a menu selection control, a button control, or another type of control that is suitable for controlling the performance resource.

In one embodiment, the network accessibility user control 502 includes a graphical slide control and a corresponding numeric input control for controlling the percentage of time that the network is available to the grid system 100. In a further embodiment, the network accessibility user control 502 also may include an indicator to identify the actual amount of time that the network is available to the grid system 100. In an alternative embodiment, the controls may comprise physical controls such as a dashboard with adjustable slides, knobs, potentiometers, or other type of controls. In one embodiment, a measurement of an external parameter or collections of external parameters may be used to influence the value of a control.

The network bandwidth allocation user control 504, in one embodiment, also includes a graphical slide control and a corresponding numeric input control for controlling the percentage of network bandwidth that is allocated to the grid system 100. The network grid allocation user control 506, in one embodiment, includes a menu selection control that allows a user to order the networks 204-206 and clients 104-110 connected to the grid system 100 in a specific hierarchy. The hierarchy may determine which networks 204-206 and clients 104-110 are allowed preferential access to the allocated network performance resources. Alternately, the hierarchy may determine which networks 204-206 and clients 104-110 should be accessed first, if available, by the network.

The dynamic enablement user control 508, in one embodiment, allows a user to select dynamic allocation and reclamation of network performance resources during grid system operations. Specifically, the dynamic enablement user control 508 may allow a user to enable dynamic allocation of additional network performance resources (more than are allocated by the allocation controls) when the additional performance resources are not being used by the network. For example, if a network allocates 10% of its total bandwidth to the grid system 100, a user may allow more than 10% of the bandwidth to be used for grid system operations if, for example, the network is using less than 50% of the bandwidth for non-grid, network operations.

Similarly, the dynamic enablement user control 508 may allow a user to enable dynamic reclamation of allocated performance resources when the network operations require use of the performance resources typically allocated for grid system operations. For example, if a network allocates 10% of the network bandwidth to the grid system 100, the network may reclaim a portion of that 10% (leaving, for example, 3% for grid system operations) if the network needs to use the additional portion for network operations.

In the case of grid system subscriptions where a client pays a fee to use the grid system resources, a network subscriber may be charged an additional fee for dynamically reclaiming performance resources that are typically allocated to the grid system 100. Alternately, the network subscriber may receive a discount for not dynamically reclaiming allocated resources. In a further embodiment, the network subscriber's fee may be determined in part by the consistency of resource allocation and network accessibility. Additionally, the network subscriber's fee may be determined in part by peak usage times of the grid computing system 100, including initiation of grid applications and allocation of performance resources during peak usage time.

Figure 6:
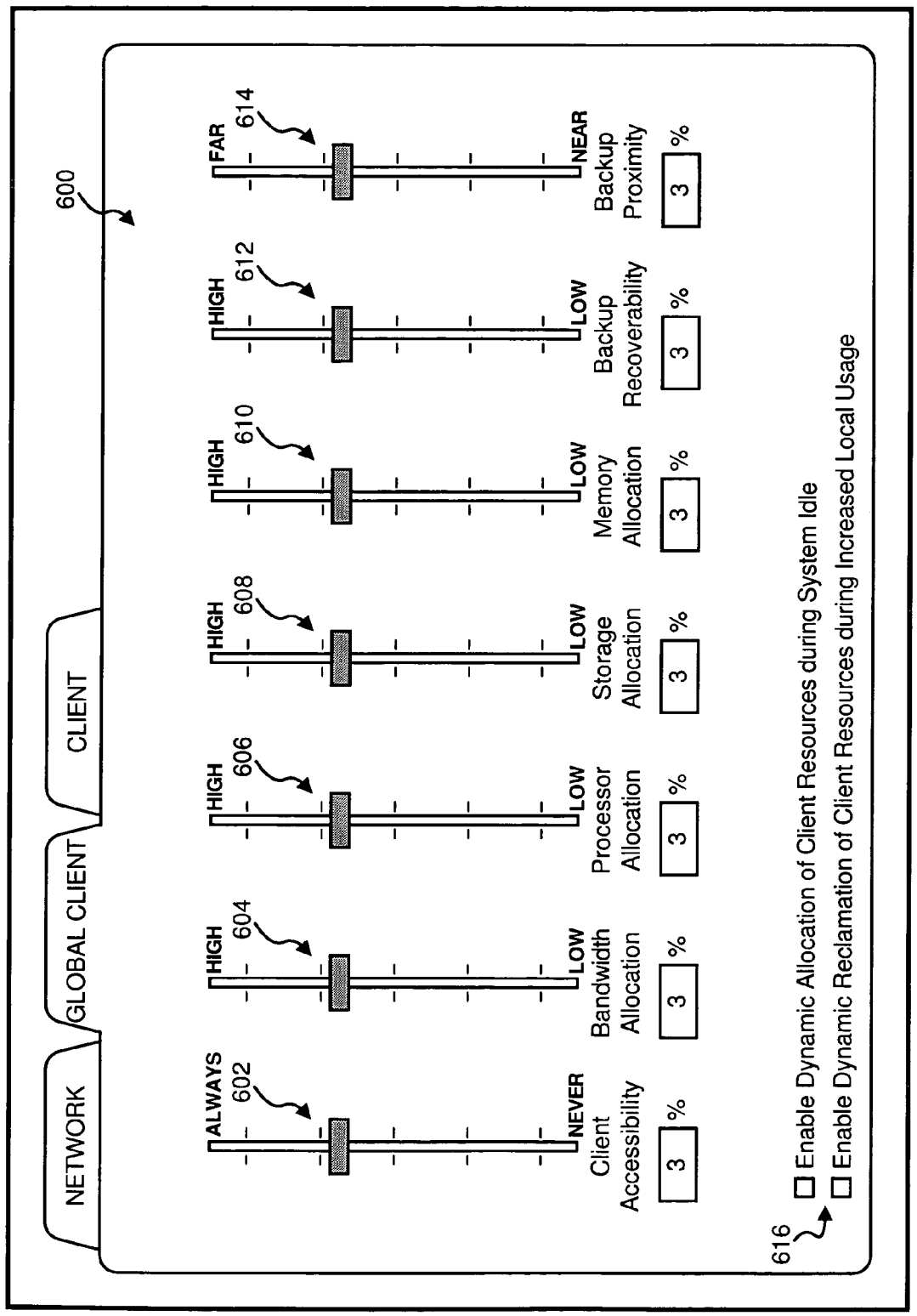
FIG. 6 is a schematic diagram illustrating one embodiment of a global client user interface in accordance with the present invention.

FIG. 6 depicts one embodiment of a global client user interface 600 that may be employed on a global on-demand manager 300. In one embodiment, the user inputs and selections received via the global client user interface 600 are stored in the global client profile 316 on the global on-demand manager 300.

The illustrated global client user interface 600 may provide global client parameters for clients 104-110 connected to the grid system 100. In one embodiment, the global client user interface 600 includes a global client accessibility user control 602, a global client bandwidth allocation user control 604, a global client processor allocation user control 606, a global client storage allocation user control 608, a global client memory allocation user control 610, a global client backup recoverability user control 612, a global client backup proximity user control 614, and a global client dynamic enablement user control 616. These user controls 602-616 control corresponding client resource parameters in a manner similar to the network user interface 500, as described above.

Figure 7:
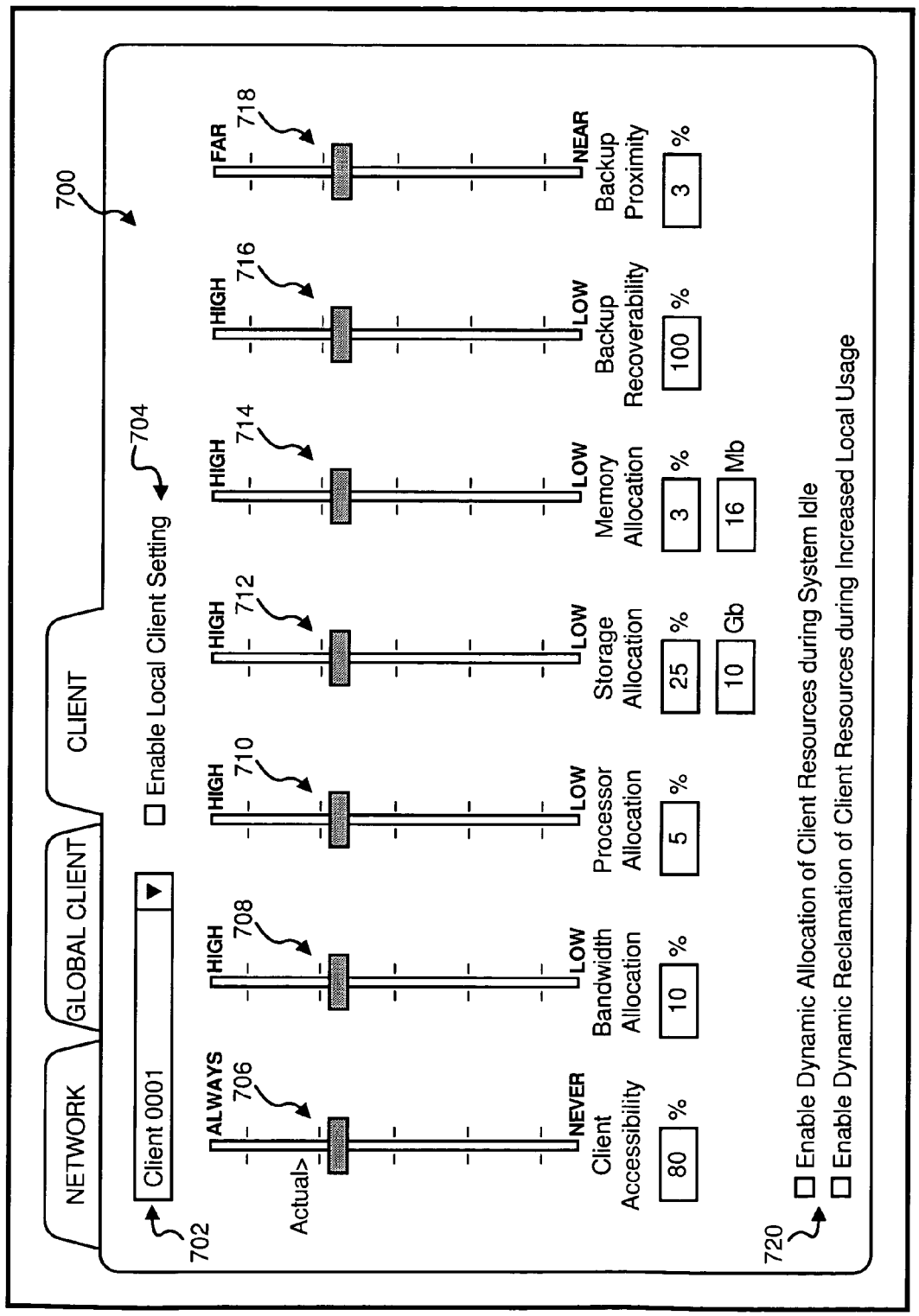
FIG. 7 is a schematic diagram illustrating one embodiment of a local client user interface in accordance with the present invention.

FIG. 7 depicts one embodiment of a local client user interface 700 that may be employed on a global on-demand manager 300 or a client 400. In one embodiment, the user inputs and selections received via the local client user interface 700 are stored in the client profiles 318 on the global on-demand manager 300. In an alternative embodiment, the user inputs and selection may be stored in the client profile 414 on a client 400.

The illustrated local client user interface 700 is similar, in part, to the global client user interface 600 of FIG. 6 and described above. However, the local client user interface 700 is configured, in one embodiment, to allow a user to define specific client performance resource parameters for a particular client 400. These user-defined parameters may override any global parameters from the global client user interface 600 and global client profile 316. In another embodiment, the global parameters may set the minimum and maximum limits between which the specific client performance resource parameters may be defined.

Additionally, the local client user interface 700, in one embodiment, may be accessed from either the global on-demand manager 300 or the client 400. When accessed from the global on-demand manager 300, the local client user interface 700 allows the user to select the particular client 400 for which parameters will be defined. In one embodiment, the user may select the particular client 400 using a client pull-down menu 702 that lists some or all of the clients 104-110 on the grid system 100.

The depicted local client user interface 700 also allows a user to enable or disable the user-defined client settings via a setting enablement user control 704. Furthermore, some of the user controls may include additional controls that may or may not be available on the global client user interface 600.

For example, the depicted client storage allocation user control allows a user to enter a quantitative amount (for example, 10 Gb) rather than only a percentage. As described above with reference to FIG. 3, the changes made over time to the client profiles 318, 414 using the local client interface 700 may be stored in the profile histories 320, 416.

The following schematic flow chart diagrams that follow are generally set forth as logical flow chart diagrams. As such, the depicted order and labeled steps are indicative of one embodiment of the presented process. Other steps and processes may be conceived that are equivalent in function, logic, or effect. Additionally, the format and symbology employed are provided to explain the logical steps of the process and are understood not to limit the scope of the process. Likewise, although various arrow types and line types may be employed in the flow chart diagrams, they are understood not to limit the scope of the corresponding process. Indeed, some arrows or other connectors may be used to indicate only the logical flow of the process. For instance, an arrow may indicate a waiting or monitoring period of unspecified duration between enumerated steps of the depicted process.

Figure 8:
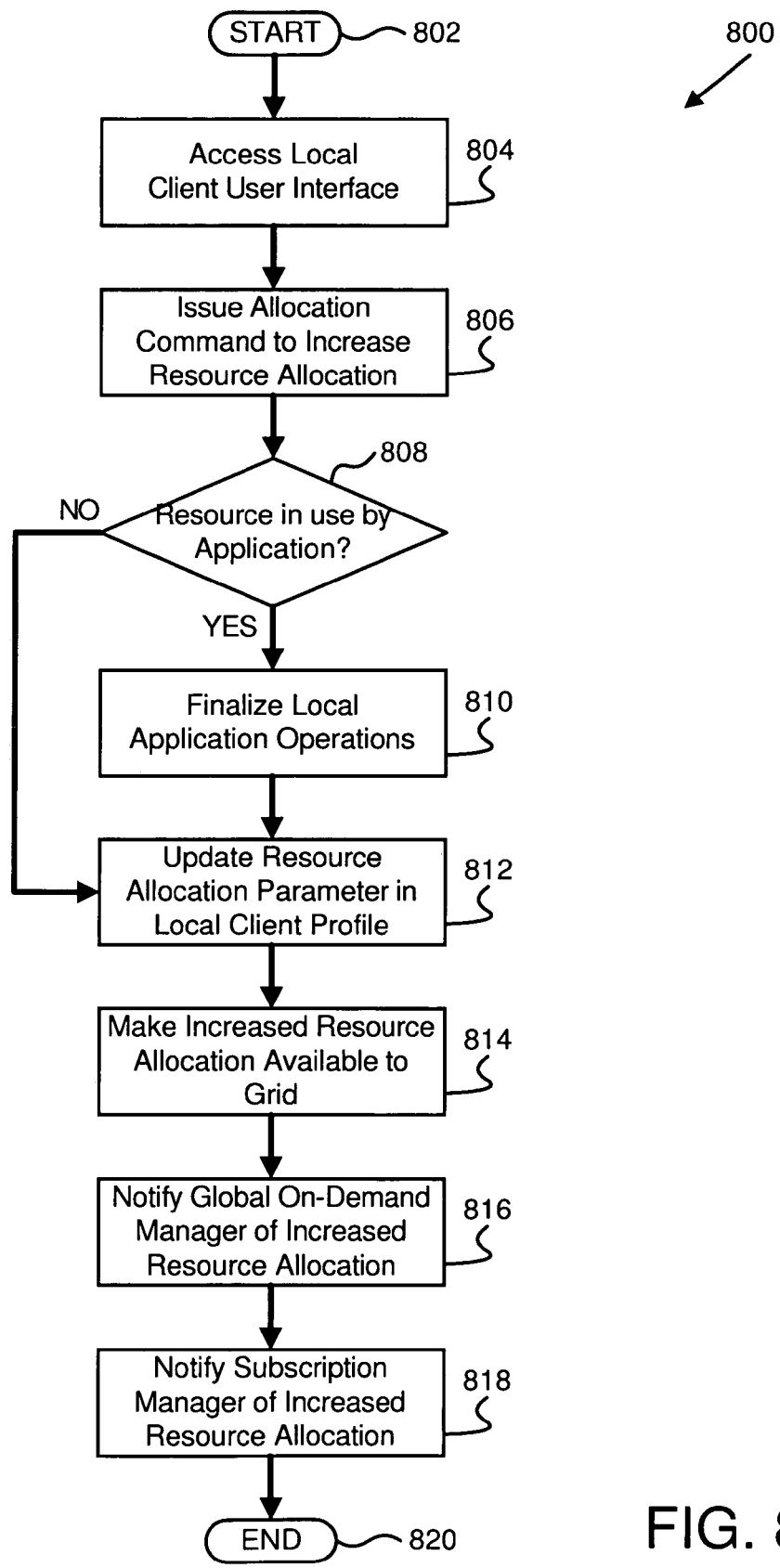
FIG. 8 is a schematic flow chart diagram illustrating one embodiment of a resource allocation method in accordance with the present invention.

FIG. 8 depicts one embodiment of a resource allocation method 800 that may be employed on a client 400 to allocate additional performance resources to change the allocation of performance resources to the grid system 100. The illustrated resource allocation method 800 begins 802 when a user accesses 804 the local client user interface 700. Using the local client user interface 700, the user may issue 806 an allocation command to specify a performance resource allocation to the grid system 100. The allocation command may be to allocate a performance resource to the grid system, in one embodiment, or to terminate a current performance resource allocation, in another embodiment. In one embodiment, the local on-demand management apparatus 412 employs the client user input module 418 to receive the user input command.

The client 400 then determines 808 if the newly allocated performance resource is currently in use by a local application. If the newly allocated performance resource is in use by a local application, the client 400 finalizes 810 the local operations. For example, if a user allocates additional memory to the grid system 100, the client 400, in one embodiment, first discontinues using the newly allocated memory prior to making the memory available to the grid system 100.

If the newly allocated performance resource is not currently in use by a local application, or after the current local application operations have been finalized, the client 400 updates 812 the appropriate resource allocation parameter in the local client profile 414. In one embodiment, the local on-demand management apparatus 412 may employ the client parameter module 420 or the client profile management module 426 to update 812 the resource allocation parameter in the local client profile 414.

The client 400 then makes 814 the newly allocated performance resource available to the grid system 100 for grid system operations. In one embodiment, the local on-demand management apparatus 412 employs the client allocation module 424 to make 814 the performance resource available to the grid system 100. The local on-demand management apparatus 412 also notifies 816 the global on-demand manager 300 of the newly allocated performance resource. In a further embodiment, the on-demand management apparatus 412 also notifies 816 the subscription manager 212 of the newly allocated performance resource. The depicted resource allocation method 800 then ends 820.

Figure 9:
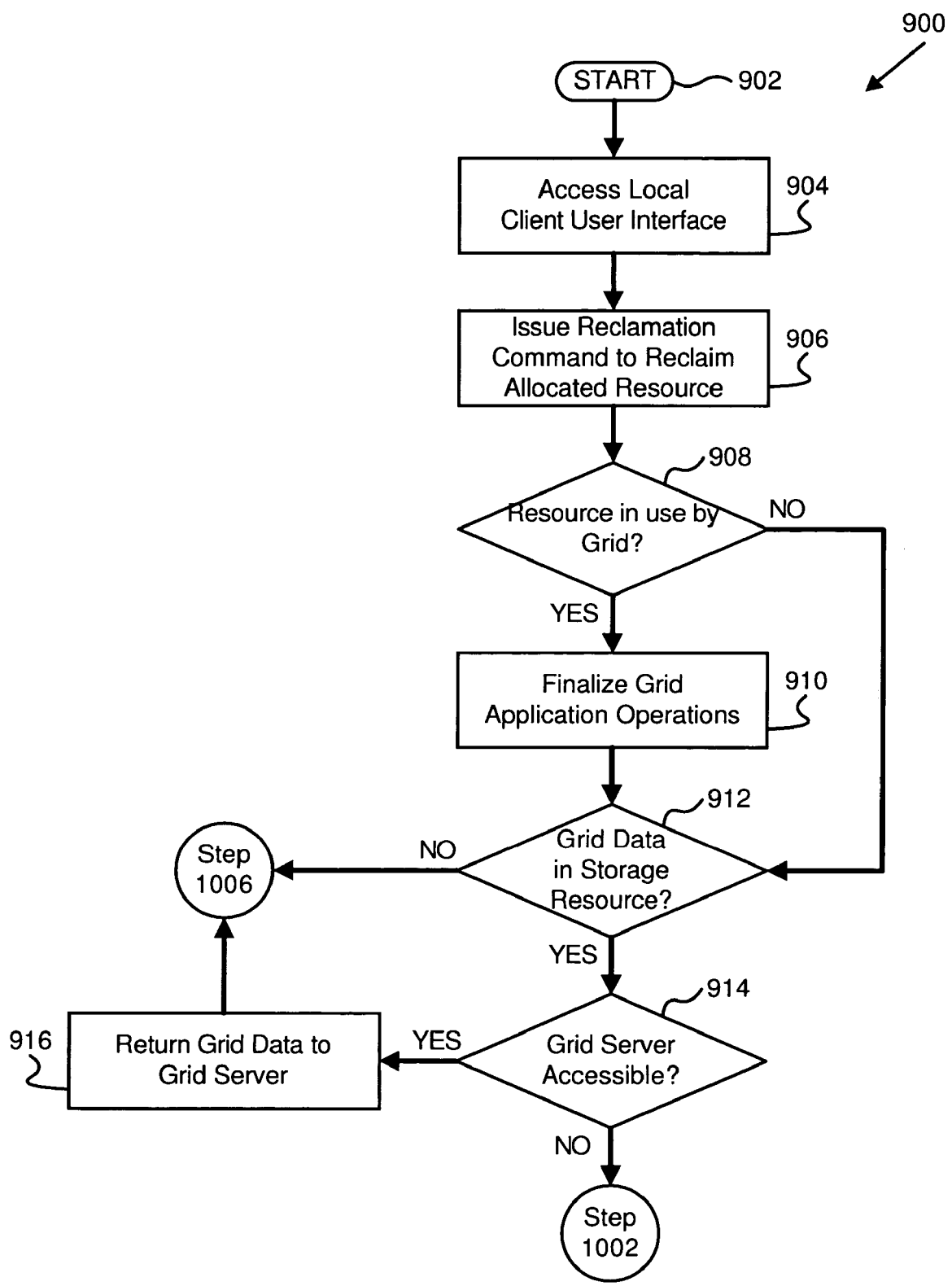
FIGS. 9 and 10 are schematic flow chart diagrams illustrating one embodiment of a resource reclamation method in accordance with the present invention.
Figure 10:
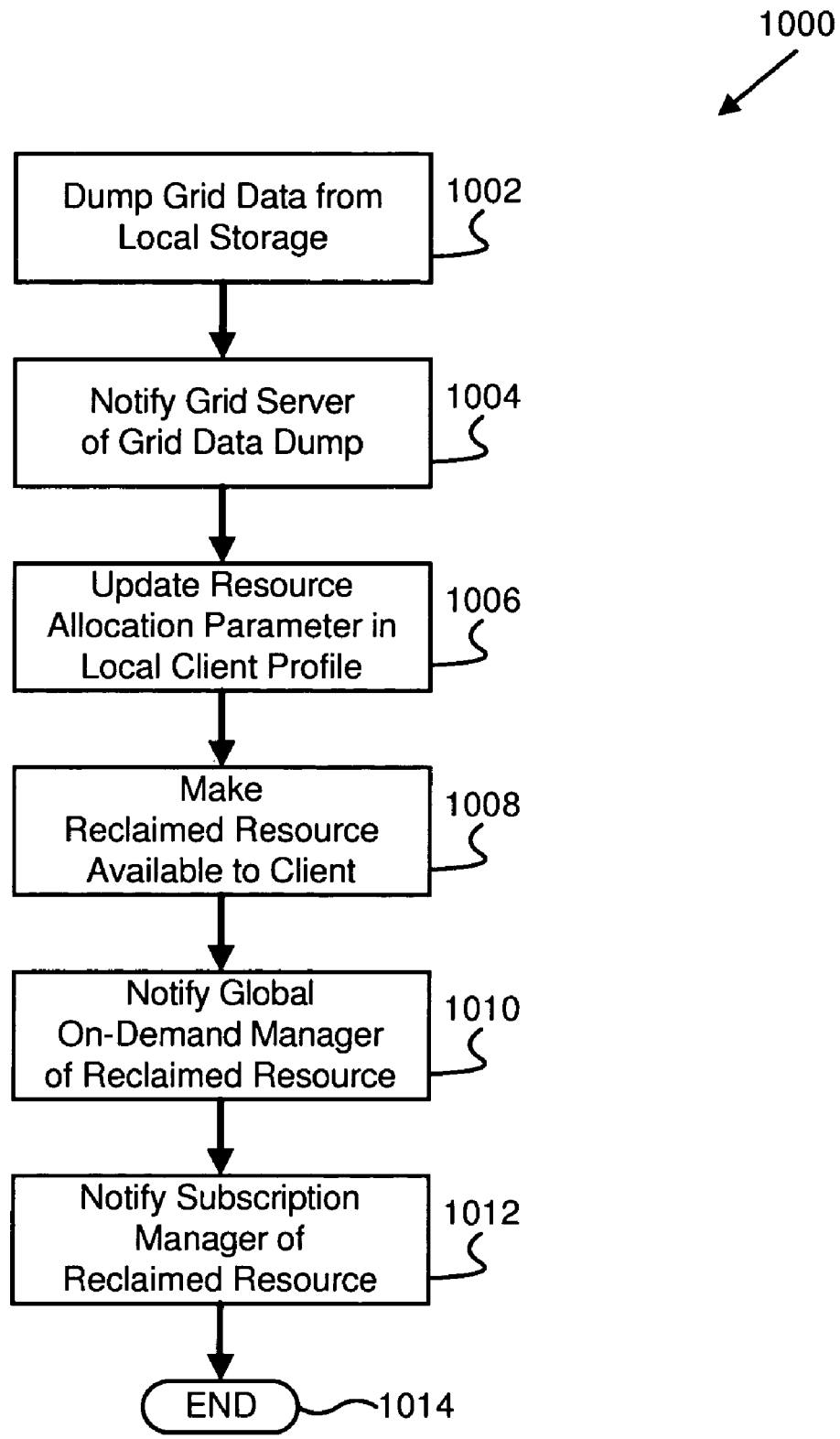

FIGS. 9 and 10 depict one embodiment of a resource reclamation method 900 that may be employed on a client 500 to reclaim allocated performance resources from the grid system 100. The illustrated resource reclamation method 900 begins 902 when a user accesses 904 the local client user interface 700. Using the local client user interface 700, the user may issue 906 a reclamation command to reclaim previously allocated performance resources from the grid system 100. In one embodiment, the local on-demand management apparatus 412 employs the client user input module 418 to receive the user input command.

The client 400 then determines 908 if the previously allocated performance resource is currently in use by a grid application. If the previously allocated performance resource is in use by a grid application, the client 400 may wait for the grid server 102 to finalize 910 the grid application operations. If the previously allocated performance resource is not currently in use by a grid application, or after the current grid application operations have been finalized, the client 400 determines 912 if grid data is currently stored in a portion of the local storage 404 that will be reclaimed, if any. If grid data is currently stored in a portion of the local storage 404 that will be reclaimed, the client 400 may attempt to return the grid data to the grid server 102 prior to making the client performance resource unavailable to the grid system 100.

In the depicted embodiment, the client 400 determines 914 if the grid server 102 is accessible. If the grid server 102 is accessible, the client 400 returns 916 the grid data to the grid server 102. The grid server 102 then may redistribute the grid data across the grid system 100 accordingly. Alternately, if the client 400 determines that the grid server 102 is unavailable, the client 400 may essentially dump or dispose of 1002 the grid data from the local storage 404 of the client 400, making the dumped or disposed grid data unavailable to the grid system 100. The client 400 may subsequently notify 1004 the grid server 1002 of the action of the data dump or disposal.

After returning 916 the grid data to the grid server 102 or dumping 1002 the grid data from the local storage 404, the client 400 updates 1006 the appropriate resource allocation parameter in the local client profile 414. In one embodiment, the local on-demand management apparatus 412 may employ the client parameter module 420 or the client profile management module 426 to update 1006 the resource allocation parameter in the local client profile 414.

The client 400 then makes 1008 the reclaimed performance resource available to the client 400 for local application operations. The local on-demand management apparatus 412 also notifies 1010 the global on-demand manager 300 of the newly reclaimed performance resource. In a further embodiment, the on-demand management apparatus 412 also notifies 1012 the subscription manager 212 of the newly reclaimed performance resource. The depicted resource reclamation method 900 then ends 1014.

With further regard to the subscription manager 212, the subscription manger 212, in one embodiment, is an apparatus for managing the information collected, used, or generated in the process of determining user fees, controlling the level of service, controlling the use of the service, controlling the contribution of performance resources, etc. to or for a grid application, from or to a customer, business, etc.

In one embodiment, the subscription manager 212 may serve at least two purposes. First, it may determine the user fees to be charged to a user based on usage of the grid resources by the user and/or contribution of performance resources by the user to the grid. Second, the subscription manager 212 may control the access, use, level of use, and so forth, to the grid system 100 and grid resources. The subscription manager 212 also may control the allocation, level of contribution, and so forth, of client performance resources to the grid system 100 based on autonomic policies described herein.

In order to manage the subscriptions of various clients 400 to the grid system 100, the subscription manager 212 may create and store a client profile, a global profile, and a customer profile. In one embodiment, the global profile of the subscription manager 212 may contain information regarding performance resource allocation and usage in order to determine the user fee for a specific customer. In one embodiment, the global profile of the subscription manager 212 may be generic to all performance resources and clients 400 using the grid system 100.

In one embodiment, the customer profile contains information that relates the global profile to the particular customer. The customer profile may aggregate information about a particular customer, including information about client performance resource allocation and locally invoked grid applications. The customer profile may be used to determine the overall fee that a customer is charged. Similarly, in one embodiment, the client profile in the subscription manger 212 may contain similar information that corresponds to a specific client 400.

In one embodiment, the subscription manager 212 determines user fees based on one or more of the instantaneous, average, maximum, minimum, planned, reserved, peak, and so forth, use of the grid system 100 by client 400 for a grid application. In another embodiment, the subscription manager 212 may track the allocation of client performance resources to the grid system 100 by a client 400. The subscription manager 212 may track one or more of the instantaneous, average, maximum, minimum, planned, reserved, peak, and so forth, level contributed. In a further embodiment, the subscription manager 212 track a combination of one or more of the factors listed above.

In another embodiment, the subscription manager 212 may monitor and control the execution of an autonomic policy by a global autonomic manager 300 or the client 400. For example, a business may subscribe to a grid system 100 for a backup retrieve grid application. To keep costs down, the business may decide to contribute performance resources to the grid system 100 from each of the connected clients 400. If a user decides to reclaim the allocated performance resources of a particular client and reduce his contribution to zero, the subscription manager 212 may alter the client profile and customer profile to determine the appropriate fee. According to the global profile of the subscription manager 212, the global autonomic manager 300 of the grid system 100 may maintain upper and lower thresholds for performance resource allocation, thereby preventing such a reclamation of all allocated resources.

In another embodiment, the subscription manager 212 may control a policy change requested by a client 400 or by a global autonomic manger 300. The customer profile of the subscription manager 212 may prevent certain changes to the resource allocation or to the grid application usage of the client 400. For example, the client profile may have a limit on the total cost that a customer may occur in a predetermined billing period. The subscription manager 212 may block certain uses by a client 400 if these limits are exceeded.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A global on-demand management apparatus for user control of a system resource on a grid computing system, the apparatus comprising:
   a storage device storing executable code;
   a processor executing the executable code, the executable code comprising
   a global user input module receiving a user global parameter control request, the global parameter control request specifying default performance parameters for a plurality of client performance resources, the default performance parameters comprising an accessibility parameter, a client bandwidth allocation parameter, a storage allocation parameter, a memory allocation parameter, a processor allocation parameter, a client backup recoverability parameter, a client packet proximity parameter, and a client backup proximity parameter, the accessibility parameter indicating an amount of time that each client performance resource is connected to the grid computing system, the client bandwidth allocation parameter indicating client bandwidth dedicated to the grid computing system, the storage allocation parameter indicating client performance resource storage allocated to the grid computing system, the memory allocation parameter indicating client performance resource memory allocated to the grid computing system, the processor allocation parameter indicating processing capability dedicated to the grid computing system, the client backup recoverability parameter indicating recoverability of data stored on each client performance resource, the client packet proximity parameter indicating a physical distance between client performance resources storing backup data packets, and the client backup proximity parameter indicating a physical distance of each client performance resource to a source client;
   a global parameter module dynamically updating the performance parameters for each client performance resource according to the global parameter control request during a concurrent grid system operation;
   a client user input module receiving a user client parameter control request, the client parameter control request specifying first performance parameters for a first client performance resource of the plurality of client performance resources, the performance parameters comprising the accessibility parameter, the client bandwidth allocation parameter, the storage allocation parameter, the memory allocation parameter, the processor allocation parameter, and the client backup recoverability parameter; and
   a client allocation module allocating the first client performance resource to the grid computing system with the first performance parameters during the concurrent grid system operation in response to the client parameter control request.

2. The apparatus of claim 1, the global reservation module further terminating the reservation of the first client performance resource in response to a client reclamation operation, the client reclamation operation reclaiming the first client performance resource and making the first client performance resource unavailable to the grid computing system.

3. The apparatus of claim 2, the global reservation module further reserving another client performance resource for the grid computing operation, wherein the other client performance resource is the same type of performance resource as the reclaimed first client performance resource.

4. The apparatus of claim 1, the executable code further comprising a global profile management module storing a network profile, the network profile comprising a network performance parameter of a network performance resource available to the grid computing system.

5. The apparatus of claim 1, the executable code further comprising a global profile management module storing a global client profile, the global client profile descriptive of the default performance parameters.

6. The apparatus of claim 1, the executable code further comprising a global profile management module storing a plurality of client profiles, each of the plurality of client profiles comprising the performance parameters of each client performance resource available to the grid computing system.

7. The apparatus of claim 6, the executable code further comprising a global profile synchronization module synchronizing one of the stored client profiles with the local client profile stored on each client performance resource.

8. The apparatus of claim 1, the executable code further comprising a global profile management module storing a plurality of profile histories, each of the plurality of profile histories comprising a history of a client performance resource.

9. The apparatus of claim 8, the global profile management module further communicating one of the plurality of profile histories to a subscription manager, the subscription manager calculating a client subscription fee based on the one of the plurality of profile histories.

10. The apparatus of claim 1, the apparatus further comprising:
    a client profile management module storing a client profile in a memory device, the client profile comprising the client performance parameters of the performance resource allocated to the grid computing system; and
    a client profile synchronization module synchronizing the client performance parameters with the client profile stored on the global on-demand apparatus during the concurrent grid system operation, overriding the performance parameters.

11. A local on-demand management apparatus for user control of a system resource on a grid computing system, the apparatus comprising:
    a storage device storing executable code;
    a processor executing the executable code, the executable code comprising
    a global user input module receiving a user global client parameter control request, the global client parameter control request specifying default performance parameters for a plurality of client performance resources, the default performance parameters comprising an accessibility parameter, a client bandwidth allocation parameter, a storage allocation parameter, a memory allocation parameter, a processor allocation parameter, a client backup recoverability parameter, a client packet proximity parameter, and a client backup proximity parameter, the accessibility parameter indicating an amount of time that each client performance resource is connected to the grid computing system, the client bandwidth allocation parameter indicating client bandwidth dedicated to the grid computing system, the storage allocation parameter indicating client performance resource storage allocated to the grid computing system, the memory allocation parameter indicating client performance resource memory allocated to the grid computing system, the processor allocation parameter indicating processing capability dedicated to the grid computing system, the client backup recoverability parameter indicating recoverability of data stored on each client performance resource, the client packet proximity parameter indicating a physical distance between client performance resources storing backup data packets, and the client backup proximity parameter indicating a physical distance of each client performance resource to a source client;
    a global parameter module dynamically updating the client performance parameters for each client performance resource according to the global parameter control request during a concurrent grid system operation;
    a client user input module receiving a user client parameter control request, the client parameter control request specifying first performance parameters for a first client performance resource of the plurality of client performance resources, the performance parameters comprising the accessibility parameter, the client bandwidth allocation parameter, the storage allocation parameter, the memory allocation parameter, the processor allocation parameter, and the client backup recoverability parameter;
    a client allocation module allocating the first client performance resource to the grid computing system with the first performance parameters during the concurrent grid system operation in response to the client parameter control request;
    a client profile management module storing a client profile in a memory device, the client profile comprising the client performance parameters; and
    a client profile synchronization module synchronizing the client performance parameters with one of a plurality of client profiles stored on a global on-demand apparatus during the grid system operation.

12. The apparatus of claim 11, the executable code further comprising a client reclamation module reclaiming the first client performance resource and making the first client performance resource unavailable to the grid computing system in response to a client reclamation operation.

13. A system for user control of a system resource on a grid computing system, the system comprising:
    a local on-demand management apparatus connected to the grid computing system, the local on-demand apparatus having local access to and control of a plurality of client performance resources
    a global on-demand management apparatus connected to the grid computing system, the global on-demand apparatus communicating with the local on-demand apparatus;
    a storage device storing executable code;
    a processor executing the executable code, the executable code comprising
        a global user input module receiving a user global parameter control request, the global parameter control request specifying default performance parameters for the plurality of client performance resources, the default performance parameters comprising an accessibility parameter, a client bandwidth allocation parameter, a storage allocation parameter, a memory allocation parameter, a processor allocation parameter, a client backup recoverability parameter, a client packet proximity parameter, and a client backup proximity parameter, the accessibility parameter indicating an amount of time that each client performance resource is connected to the grid computing system, the client bandwidth allocation parameter indicating client bandwidth dedicated to the grid computing system, the storage allocation parameter indicating client performance resource storage allocated to the grid computing system, the memory allocation parameter indicating client performance resource memory allocated to the grid computing system, the processor allocation parameter indicating processing capability dedicated to the grid computing system, the client backup recoverability parameter indicating recoverability of data stored on each client performance resource, the client packet proximity parameter indicating a physical distance between client performance resources storing backup data packets, and the client backup proximity parameter indicating a physical distance of each client performance resource to a source client;

a global parameter module dynamically updating the performance parameters for each client performance resource according to the global parameter control request during a concurrent grid system operation;

a client user input module receiving a user client parameter control request, the client parameter control request specifying first performance parameters for a first client performance resource of the plurality of client performance resources, the performance parameters comprising the accessibility parameter, the client bandwidth allocation parameter, the storage allocation parameter, the memory allocation parameter, the processor allocation parameter, and the client backup recoverability parameter; and a client allocation module allocating the first client performance resource to the grid computing system with the first performance parameters during a concurrent grid system operation in response to the client parameter control request.

14. The system of claim 13, the executable code further comprising a subscription manager determining a user fee associated with the local on-demand management apparatus, the user fee based on the allocation of the client performance resources to the grid computing system.

15. The system of claim 13, the executable code further comprising a subscription manager managing the allocated performance resource and controlling the level of service available to the local on-demand management apparatus, the level of service based the allocation of the client performance resources to the grid computing system.

16. The system of claim 13, the local on-demand apparatus comprising:

a client profile management module storing a client profile in a memory device, the client profile comprising the client performance parameters of the performance resource allocated to the grid computing system; and a client profile synchronization module synchronizing the client performance parameters with the client profile stored on the global on-demand apparatus during the concurrent grid system operation, overriding the performance parameters.

17. A method for user control of a system resource on a grid computing system, the method comprising:

receiving, by use of a processor, a user global parameter control request, the global parameter control request specifying default performance parameters for a plurality of client performance resources, the default performance parameters comprising an accessibility parameter, a client bandwidth allocation parameter, a storage allocation parameter, a memory allocation parameter, a processor allocation parameter, a client backup recoverability parameter, a client packet proximity parameter, and a client backup proximity parameter, the accessibility parameter indicating an amount of time that each client performance resource is connected to the grid computing system, the client bandwidth allocation parameter indicating client bandwidth dedicated to the grid computing system, the storage allocation parameter indicating client performance resource storage allocated to the grid computing system, the memory allocation parameter indicating client performance resource memory allocated to the grid computing system, the processor allocation parameter indicating processing capability dedicated to the grid computing system, the client backup recoverability parameter indicating recoverability of data stored on each client performance resource, the client packet proximity parameter indicating a physical distance between client performance resources storing backup data packets, and the client backup proximity parameter indicating a physical distance of each client performance resource to a source client;

dynamically updating the performance parameters for each client performance resource according to the global parameter control request during a concurrent grid system operation;

receiving a user client parameter control request, the client parameter control request specifying first performance parameters for a first client performance resource of the plurality of client performance resources, the performance parameters comprising the accessibility parameter, the client bandwidth allocation parameter, the storage allocation parameter, the memory allocation parameter, the processor allocation parameter, and the client backup recoverability parameter; and allocating the first client performance resource to the grid computing system with the first performance parameters during the concurrent grid system operation in response to the client parameter control request.

18. The method of claim 17, wherein the method further comprises terminating the reservation of the first client performance resource in response to a client reclamation operation, the client reclamation operation reclaiming the first client performance resource and making the first client performance resource unavailable to the grid computing system.

19. An apparatus for user control of a system resource on a grid computing system, the apparatus comprising:

a storage device storing executable code;

a processor executing the executable code, the executable code comprising means for receiving a user a global parameter control request, the global parameter control request specifying default performance parameters for a plurality of client performance resources, the default performance parameters comprising an accessibility parameter, a client bandwidth allocation parameter, a storage allocation parameter, a memory allocation parameter, a processor allocation parameter, a client backup recoverability parameter, a client packet proximity parameter, and a client backup proximity parameter, the accessibility parameter indicating an amount of time that each client performance resource is connected to the grid computing system, the client bandwidth allocation parameter indicating client bandwidth dedicated to the grid computing system, the storage allocation parameter indicating client performance resource storage allocated to the grid computing system, the memory allocation parameter indicating client performance resource memory allocated to the grid computing system, the processor allocation parameter indicating processing capability dedicated to the grid computing system, the client backup recoverability parameter indicating recoverability of data stored on each client performance resource, the client packet proximity parameter indicating a physical distance between client performance resources storing backup data packets, and the client backup proximity parameter indicating a physical distance of each client performance resource to a source client;

means for dynamically updating the performance parameters for each client performance resource according to the global parameter control request during a concurrent grid system operation;

means for receiving a user client parameter control request, the client parameter control request specifying first performance parameters for a first client performance resource of the plurality of client performance resources, the performance parameters comprising the accessibility parameter, the client bandwidth allocation parameter, the storage allocation parameter, the memory allocation parameter, the processor allocation parameter, and the client backup recoverability parameter; and means for allocating the first client performance resource to the grid computing system with the first performance parameters during the concurrent grid system operation in response to the client parameter control request.

20. A method for user control of a system resource on a grid computing system, the method comprising:

receiving, by use of a processor, a user global parameter control request, the global parameter control request specifying default performance parameters for a plurality of client performance resources, the default performance parameters comprising an accessibility parameter, a client bandwidth allocation parameter, a storage allocation parameter, a memory allocation parameter, a processor allocation parameter, a client backup recoverability parameter, a client packet proximity parameter, and a client backup proximity parameter, the accessibility parameter indicating an amount of time that each client performance resource is connected to the grid computing system, the client bandwidth allocation parameter indicating client bandwidth dedicated to the grid computing system, the storage allocation parameter indicating client performance resource storage allocated to the grid computing system, the memory allocation parameter indicating client performance resource memory allocated to the grid computing system, the processor allocation parameter indicating processing capability dedicated to the grid computing system, the client backup recoverability parameter indicating recoverability of data stored on each client performance resource, the client packet proximity parameter indicating a physical distance between client performance resources storing backup data packets, and the client backup proximity parameter indicating a physical distance of each client performance resource to a source client increasing an allocation of a performance;

dynamically updating the performance parameters for each client performance resource according to the global parameter control request during a concurrent grid system operation;

receiving a user client parameter control request, the client parameter control request specifying first performance parameters for a first client performance resource of the plurality of client performance resources, the performance parameters comprising the accessibility parameter, the client bandwidth allocation parameter, the storage allocation parameter, the memory allocation parameter, the processor allocation parameter, and the client backup recoverability parameter; and allocating the first client performance resource to the grid computing system with the first performance parameters during the concurrent grid system operation in response to the client parameter control request;

terminating the reservation of the first client performance resource in response to a client reclamation operation, the client reclamation operation reclaiming the first client performance resource and making the first client performance resource unavailable to the grid computing system;

reserving another client performance resource for the grid computing operation, wherein the other client performance resource is the same type of performance resource as the reclaimed client performance resource;

storing a network profile, the network profile comprising a network performance parameter of a network performance resource available to the grid computing system;

storing a global client profile in a memory device, the global client profile descriptive of a global client performance resource parameters;

storing a plurality of client profiles, each of the plurality of client profiles comprising client performance parameters of a client performance resource available to the grid computing system; and synchronizing each of the stored client profiles with each local client profile stored on each client performance resource.

21. A memory device storing executable code executed by a processor that carries out a method for user control of a system resource on a grid computing system, the method comprising:

receiving a user global parameter control request, the global parameter control request specifying default performance parameters for a plurality of client performance resources, the default performance parameters comprising an accessibility parameter, a client bandwidth allocation parameter, a storage allocation parameter, a memory allocation parameter, a processor allocation parameter, a client backup recoverability parameter, a client packet proximity parameter, and a client backup proximity parameter, the accessibility parameter indicating an amount of time that each client performance resource is connected to the grid computing system, the client bandwidth allocation parameter indicating client bandwidth dedicated to the grid computing system, the storage allocation parameter indicating client performance resource storage allocated to the grid computing system, the memory allocation parameter indicating client performance resource memory allocated to the grid computing system, the processor allocation parameter indicating processing capability dedicated to the grid computing system, the client backup recoverability parameter indicating recoverability of data stored on each client performance resource, the client packet proximity parameter indicating a physical distance between client performance resources storing backup data packets, and the client backup proximity parameter indicating a physical distance of each client performance resource to a source client;

dynamically updating the performance parameter for each client performance resource according to the global parameter control request during a concurrent grid system operation;

receiving a user client parameter control request, the client parameter control request specifying first performance parameters for a first client performance resource of the plurality of client performance resources, the performance parameters comprising the accessibility parameter, the client bandwidth allocation parameter, the storage allocation parameter, the memory allocation parameter, the processor allocation parameter, and the client backup recoverability parameter; and allocating the first client performance resource to the grid computing system with the first performance parameters during the concurrent grid system operation in response to the client parameter control request.

22. The memory device of claim 21, the method further comprising:

storing a network profile, the network profile comprising a network performance parameter of a network performance resource available to the grid computing system;

storing a global client profile in a memory device, the global client profile descriptive of the default performance parameters;

storing a plurality of client profiles, each of the plurality of client profiles comprising the client performance parameters of each client performance resource available to the grid computing system; and synchronizing one of the stored client profiles with the local client profile stored on the client performance resource.

23. The memory device of claim 21, wherein the method further comprises terminating the reservation of the first client performance resource in response to a client reclamation operation, the client reclamation operation reclaiming the first client performance resource and making the first client performance resource unavailable to the grid computing system.

24. The memory device of claim 23, wherein the method further comprises reserving another client performance resource for the grid computing operation, wherein the other client performance resource is the same type of performance resource as the reclaimed first client performance resource.

25. The memory device of claim 21, wherein the method further comprises storing a network profile, the network profile comprising a network performance parameter of a network performance resource available to the grid computing system.

26. The memory device of claim 21, wherein the method further comprises storing a global client profile, the global client profile descriptive of the default performance parameters.

27. The memory device of claim 21, wherein the method further comprises storing a plurality of client profiles, each of the plurality of client profiles comprising the client performance parameters of each client performance resource available to the grid computing system.

28. The memory device of claim 21, wherein the method further comprises synchronizing each of the stored client profiles with each local client profile stored on each client performance resource.

29. The memory device of claim 21, wherein the method further comprises storing a plurality of profile histories, each of the plurality of profile histories comprising a history of a client performance resource.

30. The memory device of claim 29, wherein the method further comprises communicating one of the plurality of profile histories to a subscription manager, the subscription manager calculating a client subscription fee based on the one of the plurality of profile histories.

* * * * *